United States Patent [19]
Funcik et al.

[11] 4,419,817
[45] Dec. 13, 1983

[54] ELECTRICAL HARNESS FABRICATION APPARATUS

[75] Inventors: Jack F. Funcik, Downers Grove; Clarence Kolanowski, LaGrange, both of Ill.

[73] Assignee: Molex Incorporated, Lisle, Ill.

[21] Appl. No.: 310,479

[22] Filed: Oct. 13, 1981

[51] Int. Cl.³ .............................................. B23P 19/00
[52] U.S. Cl. ......................................... 29/749; 29/857
[58] Field of Search ................. 29/564.4, 564.6, 564.8, 29/747, 753, 566.2, 566.3, 867, 857, 861

[56] References Cited

U.S. PATENT DOCUMENTS

| | | | |
|---|---|---|---|
| 4,043,034 | 8/1977 | Sucheski et al. | 29/747 |
| 4,126,935 | 11/1978 | Rhines et al. | 29/857 |
| 4,136,440 | 1/1979 | Brandewie et al. | 29/749 X |
| 4,235,015 | 11/1980 | Funcik et al. | 29/857 |
| 4,253,222 | 3/1981 | Brown et al. | 29/749 X |
| 4,373,261 | 2/1983 | Long, Jr. | 29/861 |

FOREIGN PATENT DOCUMENTS

| | | | |
|---|---|---|---|
| 921777 | 3/1963 | United Kingdom | 29/749 |
| 2002268 | 6/1978 | United Kingdom | 29/749 |

*Primary Examiner*—Howard N. Goldberg
*Assistant Examiner*—Carl J. Arbes
*Attorney, Agent, or Firm*—Louis A. Hecht

[57] ABSTRACT

A method and apparatus for making an electrical harness. The harness generally includes at least one connector having a housing with insulation displacement type contacts loaded therein. Each contact is connected to an insulation clad multi-wire ribbon cable. The apparatus performs the functions of positioning a connector on a first station, holding the ribbon cable at a second station remote from the first station, moving the connector to the second station so that each contact is in alignment with each wire, moving the connector toward the ribbon cable so that each wire is simultaneously displaced into its corresponding contact, moving the connector back to the first station, holding the ribbon cable at the second station at the end of its length, cutting the insulation of a predetermined segment on the end of the length at the second station, cutting the ribbon cable held at the second station, imparting a longitudinal force upon the cut length of ribbon cable to pull the cable length from the second station and strip the cut insulation segment from the end thereof.

2 Claims, 10 Drawing Figures

ELECTRICAL HARNESS FABRICATION APPARATUS

BACKGROUND OF THE INVENTION

1. Field of the Invention

The present invention relates generally to a method and apparatus for making electrical harness of the type including the connector having a housing with insulation displacement type contacts loaded therein, each contact connected to an insulation clad wire.

2. Brief Description of the Prior Art

The invention described and claimed herein is an improvement over the method and apparatus disclosed in U.S. Pat. No. 4,235,015 entitled "Electrical Harness Fabrication Method and Apparatus", dated Nov. 25, 1980 and assigned to the assignee of the present invention. The method and apparatus disclosed in said prior patent performs the following functions:

positioning a connector at a first station;

holding at least a number of wires corresponding to the number of contacts at a second station remote from said first station;

moving the said connector to said second station so that each contact is in alignment with each held wire;

simultaneously inserting each wire into its corresponding contact at the second station;

moving said connector back to said first station and simultaneously drawing a predetermined length of wire defined between said connector and said second station;

holding each wire at a second station at the end of the desired length;

cutting all held wires at the second station;

cutting the insulation of a predetermined segment on each end of the desired length at the second station; and imparting a force upon said cut lengths of wire to pull said wire lengths from the second station and strip the cut insulation segment from each end thereof.

The machine for performing the method set forth above comprises:

a first station whereat a connector is initially position;

a second station remote from said first station;

holding means mounted at said second station for selectively gripping said wires;

insertion means mounted at the second station for simultaneously displacing each wire into its corresponding contact;

a connector carrier for mounting the connector thereon in a given disposition removable between said first station and said second station in alignment with said wires;

holding means mounted at said second station for selectively gripping said wires;

wire cutting means mountd at the second station for cutting the wires to the same length;

wire pulling means for imparting a force upon said cut lengths of wire for pulling said wire lengths from the second station and strip the cut insulation segment from each end thereof;

control means for sequentially actuating said insertion means, holding means, wire cutting means, connector carrier and wire pulling means in a given order, said control means moving said connector carrier from said first station to said second station, actuating said insertion means so that said wires are displaced in its corresponding contact, releasing said wire holding means, moving said connector carrier back to said first station drawing wire therewith, actuating said wire holding means, actuating the wire cutting means and the wire pulling means to form a completed electrical harness.

In the above mentioned U.S. Pat. No. 4,235,015, a looping assembly which forms loops of differing magnitudes in the wire lengths imparts an axial force upon the cut lengths of wire. In this manner, an electrical harness having different wire lengths can be effected.

Although a looping assembly can be used to produce an electrical harness having the same wire lengths, it can be appreciated that the size of such an assembly would be expensive to make and cumbersome to use for such a limited purpose.

SUMMARY OF THE INVENTION

It is, therefore, the principal object of the present invention to provide an improved method and apparatus for making electrical harness of the type comprising at least one connector having a housing with insulation displacement type contacts loaded therein each contact connected to an insulation clad wire of the same length. More particularly, it is the principal object of the invention to provide an improved method and apparatus of the type disclosed in U.S. Pat. No. 4,235,015 as described in detail above wherein all of the wire lengths are the same.

The improved method of performing the invention contemplated herein is characterized by imparting said force longitudinally on the wire in a direction away from said second station.

It is another object of the present invention to provide an improved machine to practice the improved method recited above. More particularly, the improvement comprising of the invention is a new means of imparting a force upon the cut lengths of wire which is characterized by:

a reciprocally mounted stripping block having a limiting surface defining the furthest limit of the first station away from said second station, said stripping block being movable between a first position in the path of travel of the connector carrier whereby the connector carrier would abut said limiting surface when at the first station and a second position out of the path of travel of the connector carrier whereby said connector would be able to travel past said first station in a direction away from said second station;

said control means moving the stripping block to its second position to allow the carrier to travel past said first station and exert a longitudinal force against said wires.

DESCRIPTION OF THE PREFERRED EMBODIMENT

Looking at FIGS. 1 and 3-10, the electrical harness machine, generally designated 10, of the present invention is shown. The machine 10 is intended to automatically produce a completed electrical harness, generally designated 12, as shown in FIG. 2.

Figure 2:
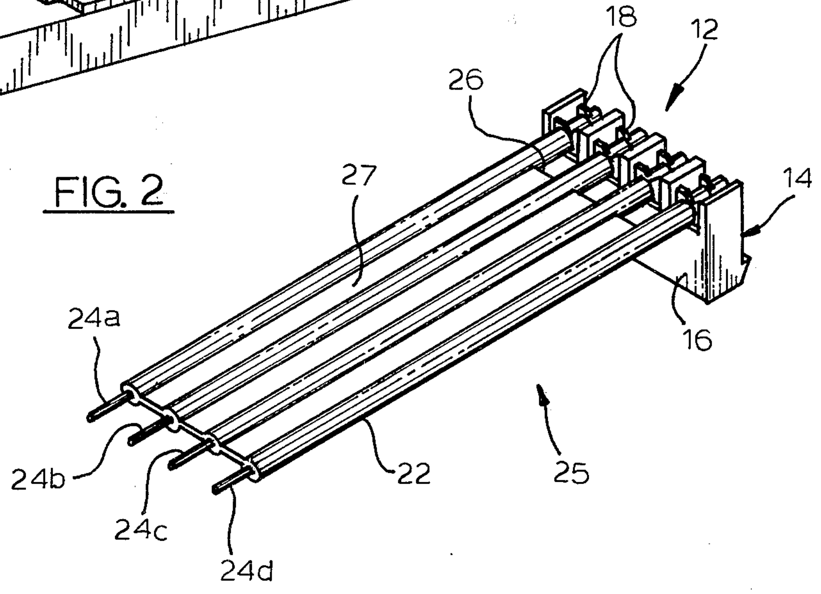
FIG. 2 is a perspective view of a completed electrical harness made according to the method and apparatus of the present invention.

Looking at FIG. 2, the electrical harness 12 is seen to generally include a connector, generally designated 14, comprising an insulated housing 16, having a plurality of insulation displacement type contacts 18 preloaded therein. Each contact has the usual insulation displacement type slot (not shown) which is adapted to slice through the insulation of insulation clad wire lengths 22 connected thereto. Each end of the wire lengths 22 has an exposed stripped conductor portion 24 thereon.

It is to be noted that the wire lengths 22 form a part of a ribbon cable assembly 25 depicted in FIG. 2. Instead of using a ribbon cable, the wire lengths could be discrete.

The ribbon cable 25 has notched sections 26 formed in the insulation webs 27 between wires 22. The purpose of the notched sections is to facilitate insulation displacement into the contacts 18.

The exposed conductor portions 24 are of the same magnitude as shown in FIG. 2. However, it is to be understood that the method and machine to be described hereinafter can be employed to make electrical harness wherein the exposed conductor portions are of differing magnitudes or wherein no exposed conductor is present at all. It is also understood that although a four circuit connector 14 is illustrated in the drawings, any size connector can be used.

Looking once again at FIGS. 1 and 3–10, the machine 10 is generally seen to include a first station, generally designated 28, and a second station, generally designated 30, remote from said first station. A connector 14 is initially positioned at the first station 28 and a finished electrical harness 12 is ejected therefrom later in the electrical harness fabrication operation.

The wires 22 are connected to the insulation displacement contacts at the second station 30. In addition, the end of the ribbon cable 25 is cut and stripped at the second station 30.

The connector 14 is positionable on a connector carrier, generally designated 32, which is movable between the first station 28 and the second station 30. The connector carrier 32 includes a generally U-shaped connector nest, generally designated 34, having an opening 38 formed in the bottom thereof for purposes which will become more apparent hereinafter. The nest 34 is adapted to move between the first station 28 and the second station 30 in response to a carrier drive 42.

A free rolling wire reel 44 is provided on the side of the second station 30 opposite the first station 28. The uncut cable 46 fed from the reel 44 is threaded through a wire guide 47 through a notcher 48*a* and 48*b*. The upper portion of the notcher 48*a* is adapted to move downwardly in response to a notcher drive 49 to produce the notched sections 26 formed in the insulation webs 27.

Looking at FIGS. 3–10, the second station 30 is seen to have an upper mounting assembly 50 and a lower mounting assembly 52. More particularly, each mounting assembly is movable between an "up" position and "down" position in response to an upper mounting assembly drive 62 and a lower mounting assembly drive 68, respectively.

In order to hold the cable 46 at the second station 30, there is provided wire holding means in the form of upper and lower wire gripping members 54 and 56, respectively. The upper wire gripping member 54 is secured to the upper mounting assembly 50 for movement therewith between its up and down positions. The lower wire gripping member 56 is stationary throughout all the operations of the machine 10. Thus, when the upper housing assembly 50 is in its down position, the wire gripping members 54 and 56 hold the cable 46 at the second station 30. When the upper mounting assembly 62 is in its up position, the wire gripping members 54 and 56 are spaced apart thereby releasing the cable 46.

Mounted adjacent the upper and lower wire gripping members 54 and 56 is an insulation displacement insertion blade 58 of a configuration well-known in the art. The insertion blade 58 is secured to the upper mounting assembly 50 for movement therewith.

A plurality of upper insulation cutting blades 60 are fixed on the upper mounting assembly 50 for movement therewith for cutting the insulation on the end of the cable 25. It is to be noted that the blades 60 are not only aligned with each circuit wire, but, as shown, are in the same longitudinal disposition with respect to one another. If, however, it is desired to strip different lengths of insulation, the blades 60 can be mounted in different longitudinal dispositions with respect to one another.

The lower mounting assembly 52 has a wire shearing blade 64 secured thereto for movement therewith. The shearing blade 64 is capable of cutting the cable when it is pinched between the blade and the side surface of the insertion blade 58. This occurs when the upper mounting assembly 50 is in its down position and the lower mounting assembly 52 is in its up position.

The lower mounting assembly 52 also has a plurality of lower insulation cutting blades 66 secured for movement therewith. Each of the lower insulation blades 66 is in alignment with the upper insulation cutting blades 60 and will cooperate to cut the insulation at the ends of the wire lengths 22 when the assembly is in its up position.

Connector moving means 70, which comprises a portion of the insertion means, is associated with, but not connected to, the lower mounting assembly 52. The connector moving means 70 is mounted for reciprocal movement between an "up" position and a "down" position and is adapted to engage a connector 14 at the second station 30 to move the connector upwardly toward the insertion blade 58. The connector moving means 70 is movable in response to an insertion drive 72.

Figure 1:
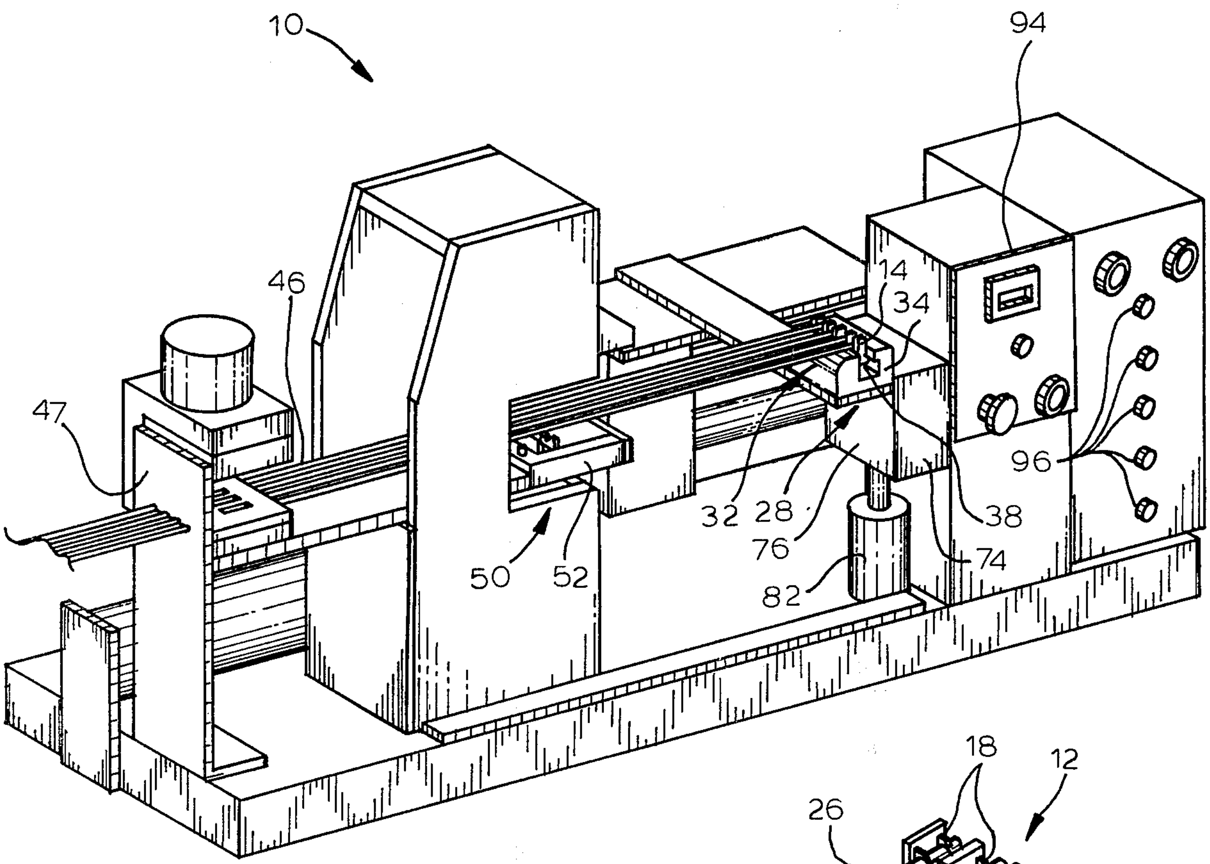
FIG. 1 is a perspective view of the machine of the present invention.
Figure 9:
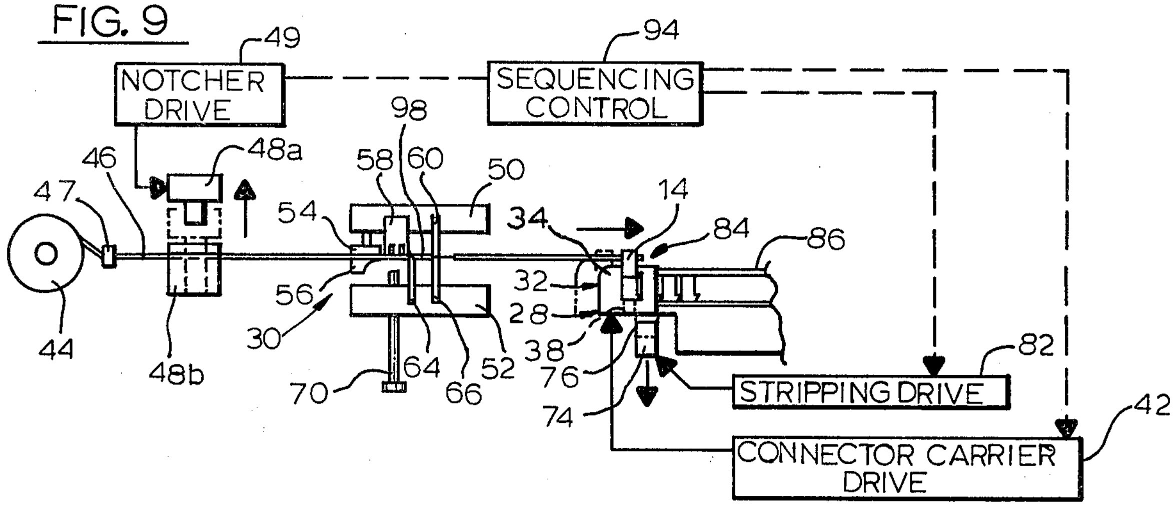
Figure 10:
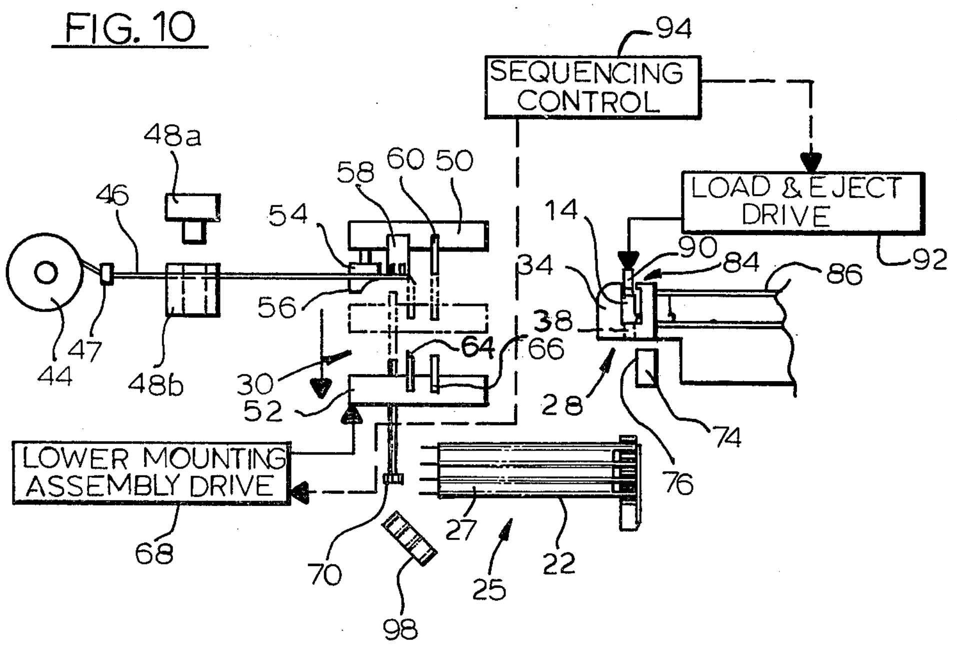

A reciprocally mounted stripping block, generally designated 74, is located immediately adjacent the first station 28 on the side remote from the second station 30. The stripping block 74 has a limiting surface 76 which defines the furthest limit of the first station away from the second station. The stripping block 74 is movable in response to a stripping drive 82 between a first position and a second position. The first position occurs when the stripping block 74 is in the path of travel of the connector carrier 32 as is shown in FIG. 1. More particularly, the connector carrier 32 will abut the limiting surface 76 which prevents the carrier from moving further away from the second station 30. The second position occurs when the stripping block 74 is below and out of the path of travel of the connector carrier 32 as is shown in FIGS. 9 and 10. When the stripping block 74 is in the second position, the connector carrier 32 is able to travel past the first station 28 in a direction away from the second station 30.

Located adjacent the first station 28 is a load and eject assembly, generally designated 84. (Not shown in FIG. 1) The load and eject assembly 84 generally includes a connector magazine 86 which stores a plurality of connectors 14 for positioning, one at a time, at the first station 28. A push member 90 is provided to engage a connector 14 and push it into the connector nest 34 after a completed electrical harness 12 is presented at the first station 28. At the same time the push member 90 loads the new connector 14 into the connector nest 34, the push member 90 engages the completed electrical harness 12 to eject it from the connector nest 34 in response to a load and eject drive 92.

In operation, a sequencing control 94 actuates each of the drives 42, 49, 62, 68, 72, 82 and 92 in a sequence which will produce the desired completed electrical harness 12. Several control buttons 92 (FIG. 1) can be provided to manually override or stop the sequence.

Figure 3:
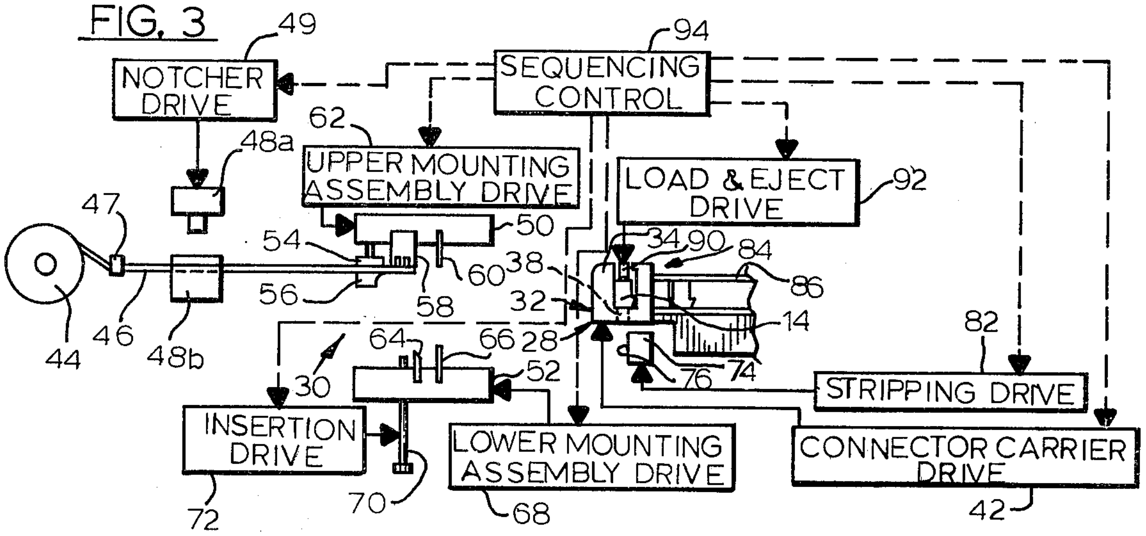
FIGS. 3-10 are schematic flow diagrams illustrating the method of the present invention.

Initially, the machine 10 commences operation in the configuration illustrated in FIG. 3. At this point, the cable 46 from the wire reel 44 has been threaded through the wire guide 47 through the notcher **48*a* and 48*b* to the second station 30 whereat it is held by the upper and lower wire gripping members 54 and 56. The upper mounting assembly 50 is in its down position and the lower mounting assembly 52 is also in its down position. The connector nest 34 is at the first station 28 having a connector 14 loaded therein. The stripping block 74 is in its second position allowing the nest 34 to move somewhat to the right of the first station 28**.

Figure 4:
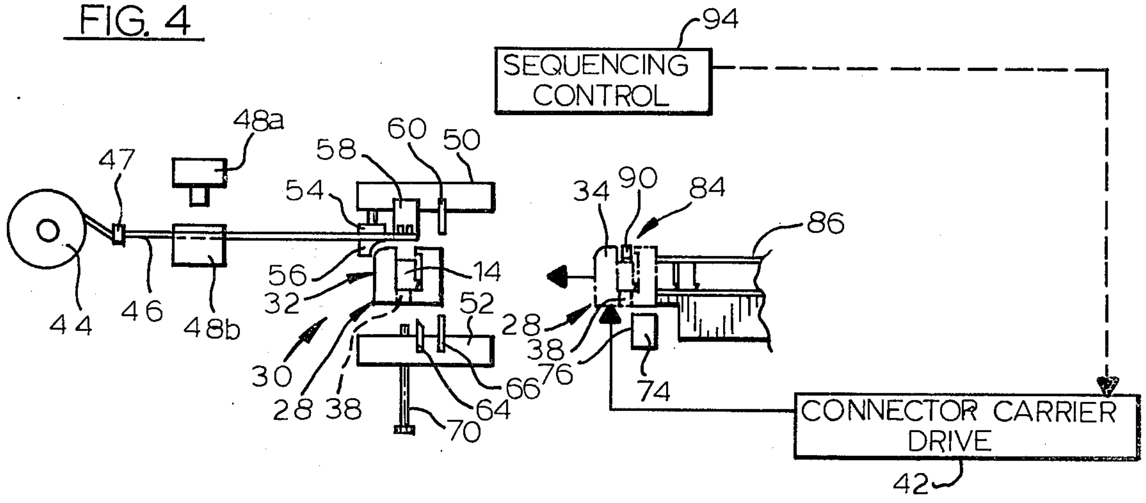
Figure 5:
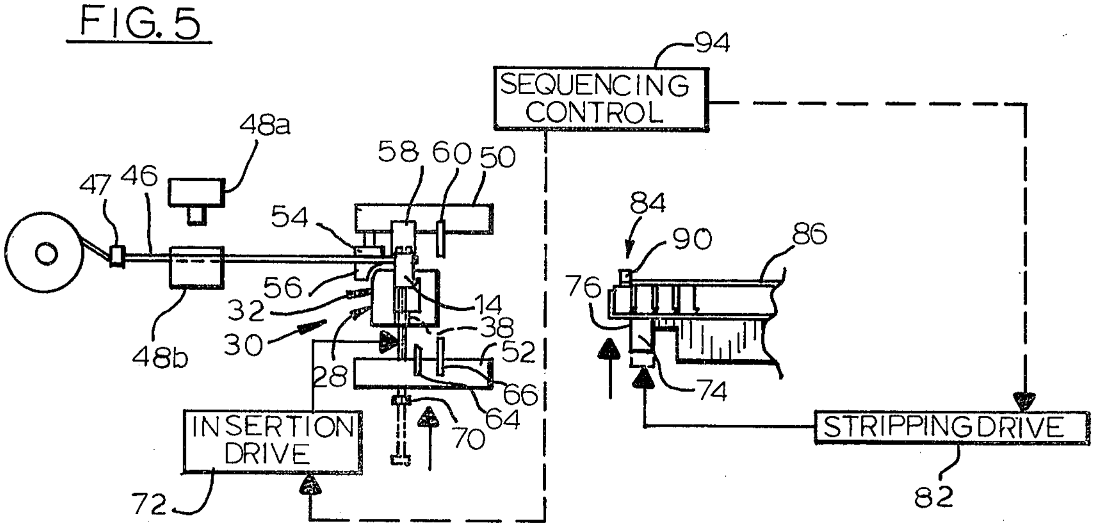

When the machine 10 commences operation, the connector nest 34 is moved from the first station 28 to the second station 30 as is shown in FIG. 4. The stripping block 74 is moved upwardly to its first position. The connector moving means 70 is then actuated so that it is received through the opening 38 in the connector nest 34 to engage and move the connector 14 upwardly toward the insulation displacement insertion blade 58 as is shown in FIG. 5.

Figure 6:
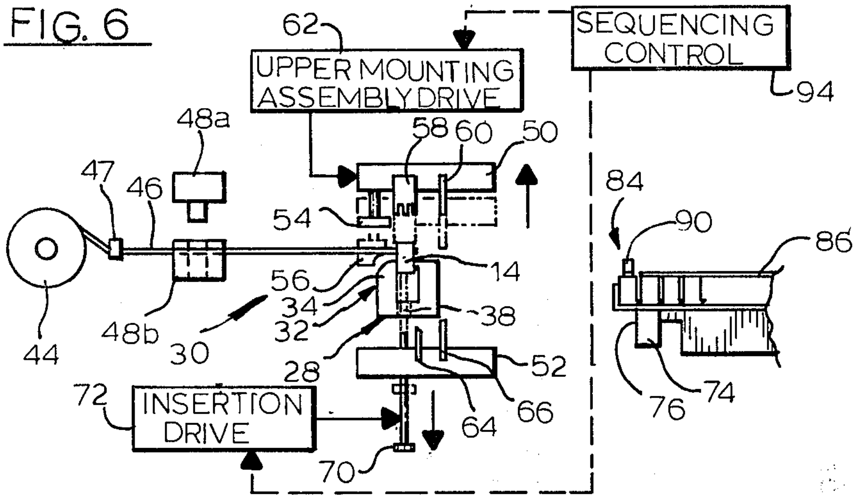

The connector moving means 70 is then reciprocally retracted and the upper mounting assembly 50 assumes its up position. Because the upper mounting assembly 50 assumes its up position, the upper and lower wire gripping members 54 and 56 release the wire and the insertion blade 58 is lifted out of engagement with the cable 25 as is shown in FIG. 6.

It is to be noted that the connector 14, which originally was seated at the bottom of the nest 34, is now in a raised position because of the connection to the length of cable 25. The connector 14 assumes this raised position for the remainder of the harness making cycle.

Figure 7:
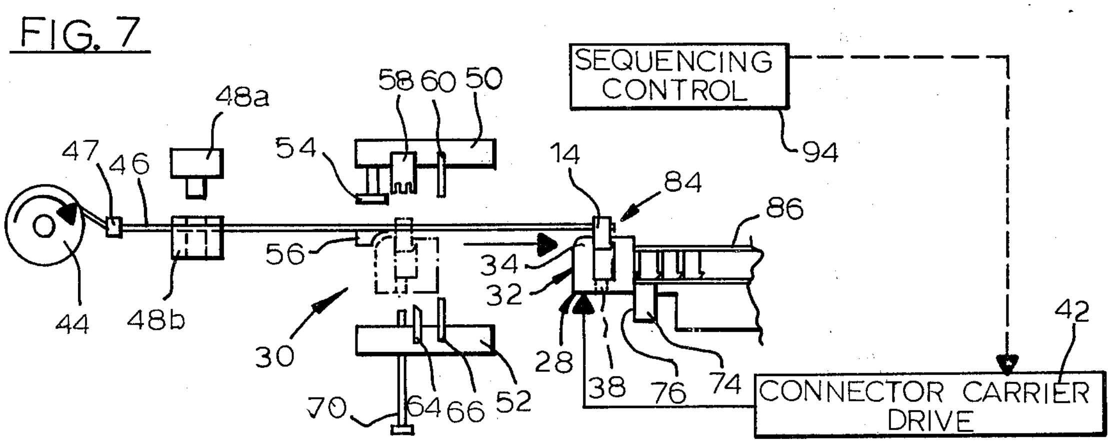

As is shown in FIG. 7, the connector nest 34 is then moved from the second station 30 to the first station 28. Because the cable 46 is connected to the contacts 18, a length of cable is drawn from the reel 44 without any positive or power driving force applied to the cable itself. As a result, no sophisticated or extra mechanism is required to power feed the cable in order to measure out a given length which is defined between the connector 14 at the first station 28 and the shearing blade 64 at the second station 30.

Figure 8:
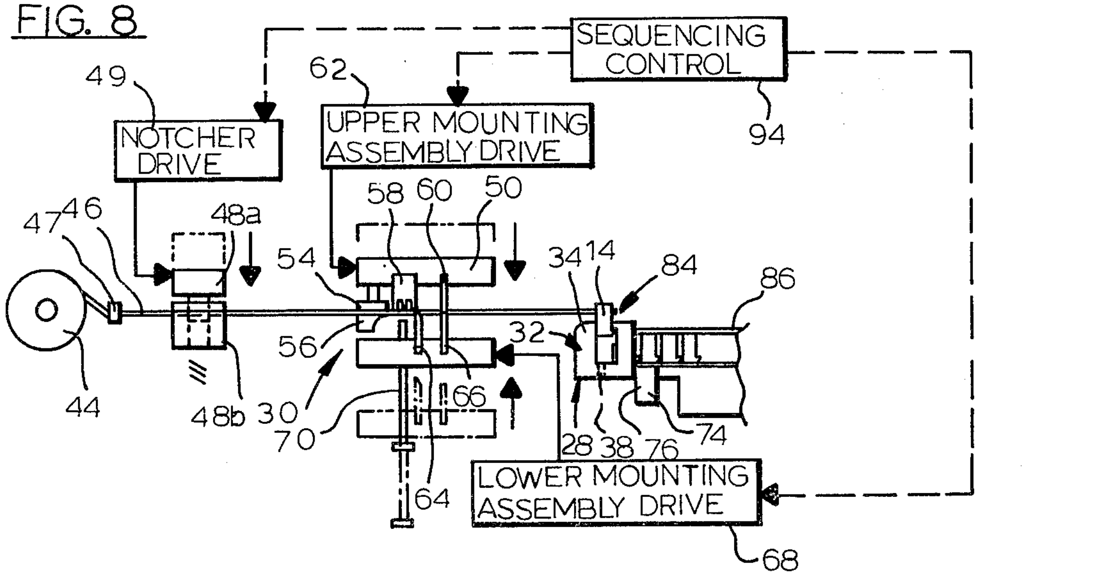

In the next step of operation shown in FIG. 8, the upper and lower mounting assemblies 50 and 52 move toward each other so that the upper mounting assembly 50 is in its down position and the lower mounting assembly 52 is in its up position. This produces three results: (a) the upper and lower insulation cutting blades 60 and 66, respectively, cut the insulation on the end of the cable length 25 opposite the connector 14; (b) the insertion blade 58 and wire shearing blade 64 cooperate to cut the cable 25 at the end of the desired lengths; and (c) the upper and lower gripping members 54 and 56 hold the cable 46 preparatory to the next harness making cycle.

The stripping block 74 then actuated so that it moves to its second position disengaging the connector carrier 32 with the limiting surface 76. When this occurs, the connector carrier 32 is allowed to travel a short distance further away from the second station 30 imparting a longitudinal force on the cut cable length 35. As a result, the end of the cable length 25 is pulled out from the insulation cutting blade 60 and 66 stripping the insulation segment 98 therefrom and freeing the ends of the cable 25 from the second station 30 as is shown in FIG. 9. At this point, a finished electrical harness 12 is positioned in the connector nest 34. A new connector 14 has already been positioned adjacent the first station at a height lower than the connector 14 of the completed electrical harness 12.

Looking at FIG. 10, the last step of the harness making cycle removes the segment of insulation 98 from the second station. In addition, the load and eject assembly 84 is actuated by the load and eject drive 92 so that the push member 90 ejects the completed electrical harness 12 from the connector nest 34 and loads a new connector 14 into the connector nest 34. The machine 10 is now ready to repeat the cycle.

We claim:

1. In a machine for making an electrical harness, said harness comprising at least one connector with insulation displacement type contacts loaded therein, each contact connected to an insulation clad wire, each wire being of the same length, said machine including:

- a first station whereat a connector is initially positioned;
- a second station remote from said first station;
- holding means mounted at said second station for selectively gripping said wires;
- insertion means mounted at the second station for simultaneously displacing each wire into its corresponding contact;
- a connector carrier for mounting the connector thereon in a given disposition removable between said first station and said second station in alignment with said wires;
- holding means mounted at said second station for selectively gripping said wires;
- wire cutting means mounted at the second station for cutting the wires to the same length;
- wire pulling means for imparting a force upon said cut lengths of wire for pulling said wire lengths from the second station and stripping the cut insulation segment from each end thereof;
- control means for sequentially actuating said insertion means, holding means, wire cutting means, connector carrier and wire pulling means in a given order, said control means moving said connector carrier from said first station to said second station, actuating said insertion means so that said wires are displaced in their corresponding contacts, releasing said wire holding means, moving said connector carrier back to said first station drawing wire therewith, actuating said wire holding means, actuating the wire cutting means and the wire pulling means to form a completed electrical harness.

the improvement in said wire pulling means comprising:

- a reciprocally mounted stripping block having a limiting surface defining the furthest limit of the first station away from said second station, said stripping block being movable in a path of travel generally transverse to the path of travel of the path of the connector carrier between a first position in the path of travel of the connector carrier whereby the connector carrier would abut said limiting surface when at the first station and a second position out of the path of travel of the connector carrier whereby said connector carrier would be able to travel past said first station in a direction away from the second station; and said control means moving the stripping block to its second position to allow said connector carrier to travel past said first station and exert a longitudinal force against said wires.

2. The machine of claim 1 wherein said wires are joined together by webs of insulation to form ribbon cable and further including wire notching means for selectively removing portions of the webs of said cable prior to the actuation of said wire insertion means.

* * * * *